Feb. 13, 1968     W. A. MEYER     3,368,434
METHOD OF AND APPARATUS FOR MANUFACTURING
TUBULAR CONTAINER BODIES
Filed Jan. 17, 1966     4 Sheets-Sheet 1

INVENTOR.
WILLARD A. MEYER
BY
George P. Ziehmer
ATTORNEY

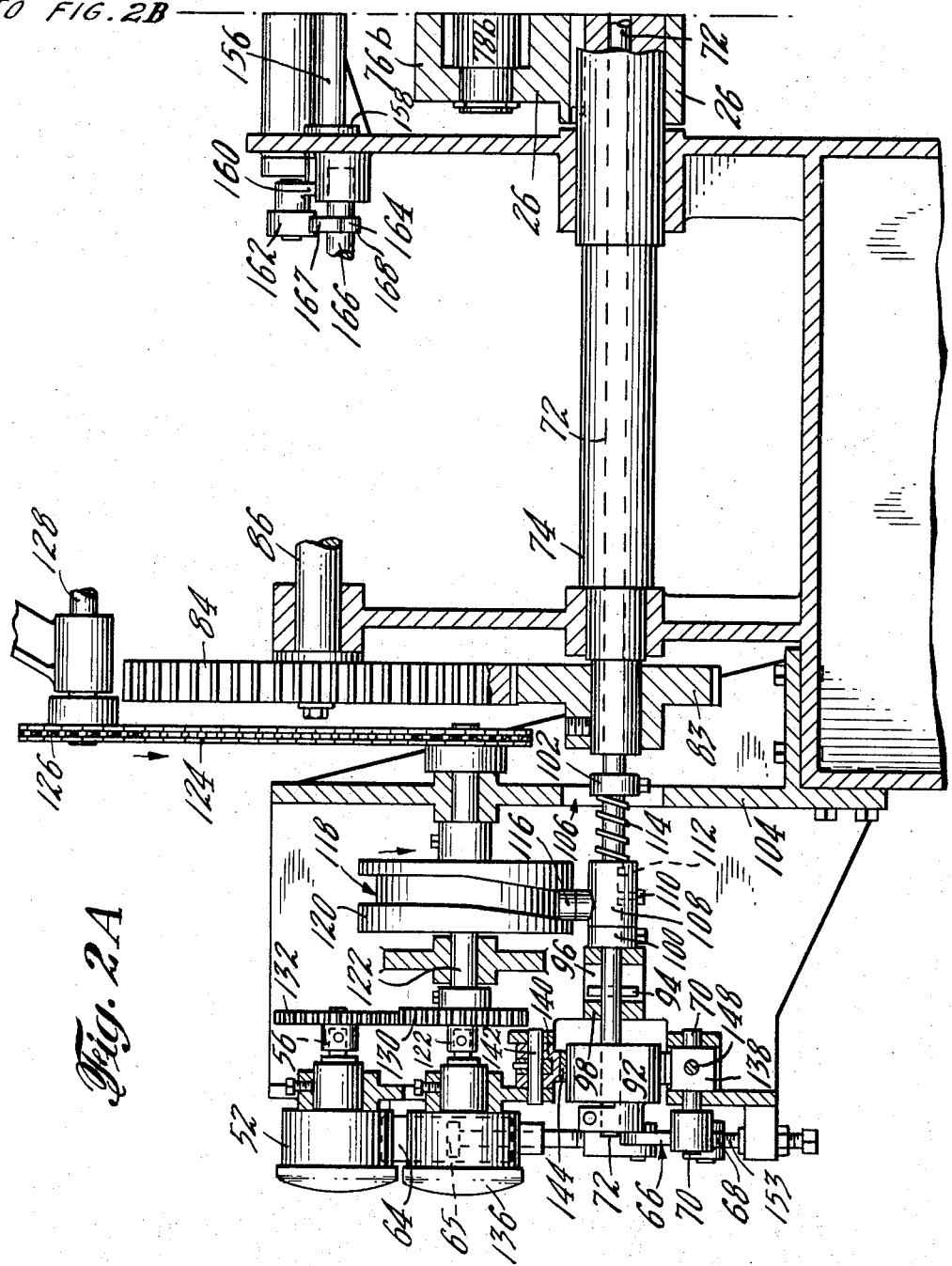

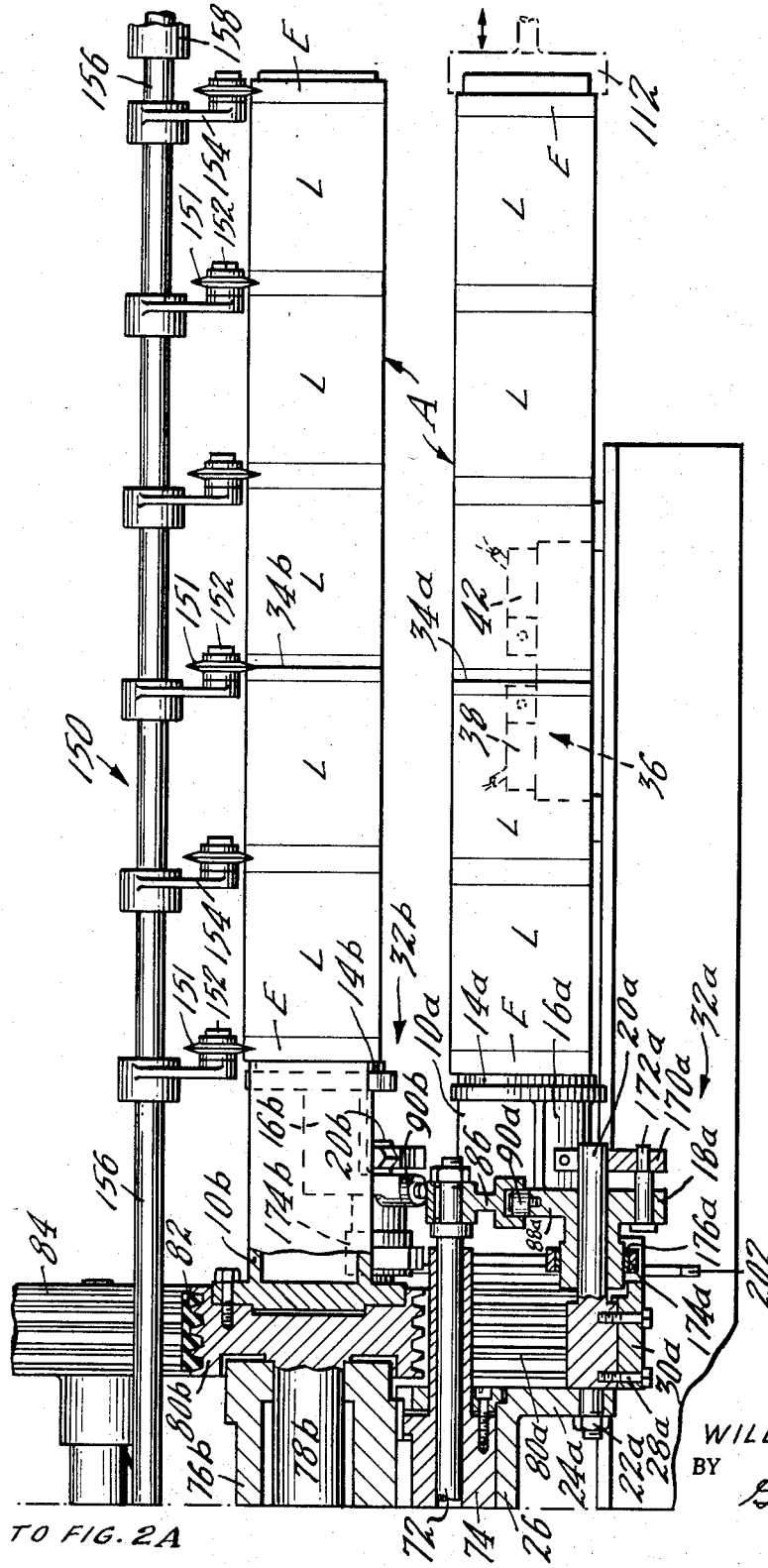

Feb. 13, 1968
W. A. MEYER
3,368,434
METHOD OF AND APPARATUS FOR MANUFACTURING
TUBULAR CONTAINER BODIES
Filed Jan. 17, 1966
4 Sheets-Sheet 4
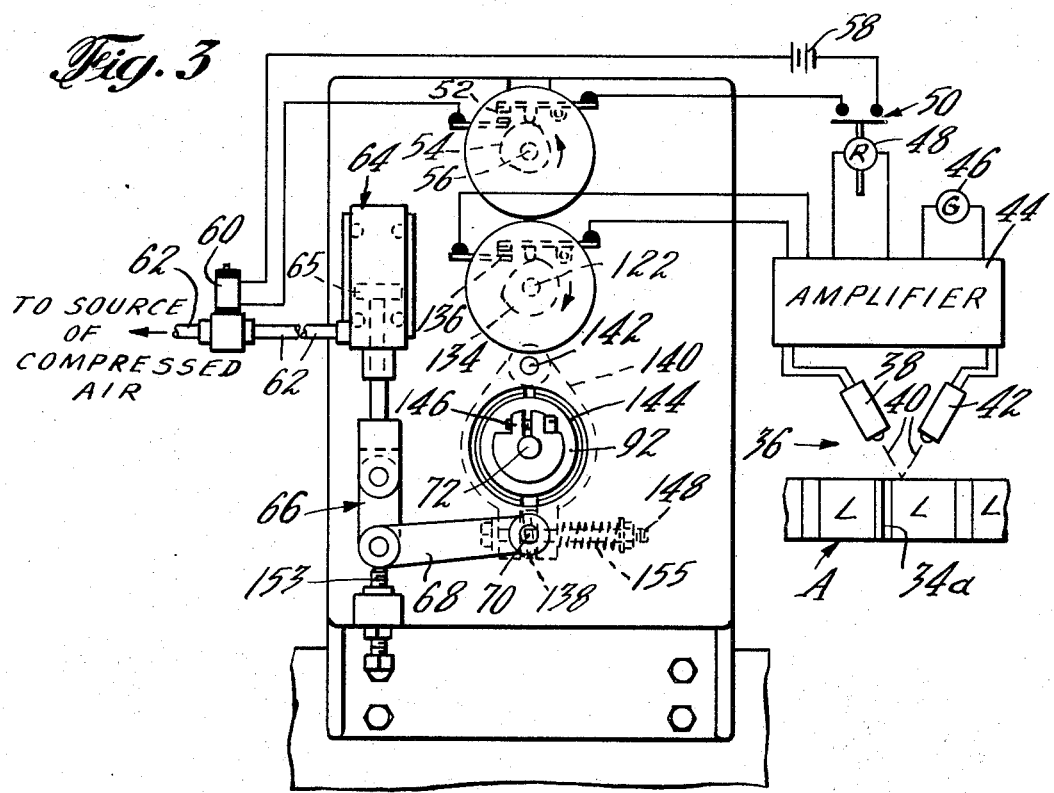
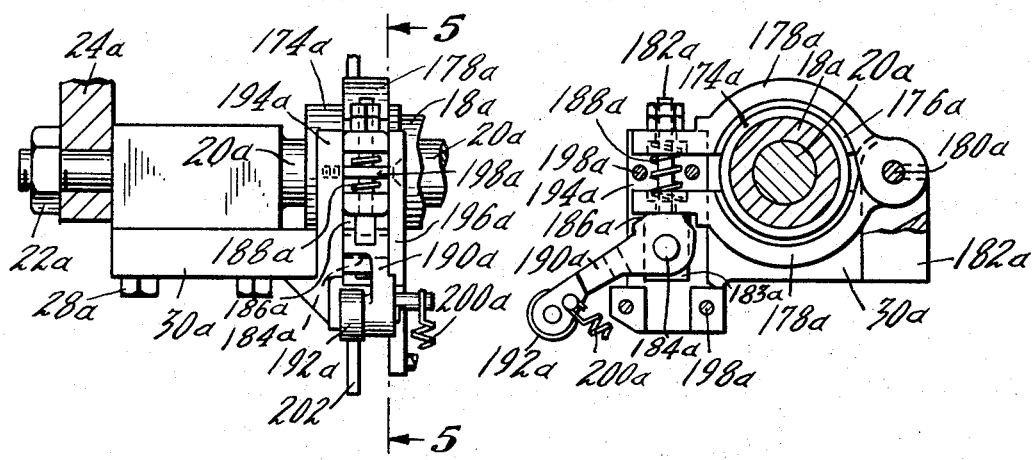
INVENTOR.
WILLARD A. MEYER
BY
George D Ziehmer
ATTORNEY

United States Patent Office 3,368,434
Patented Feb. 13, 1968

3,368,434
METHOD OF AND APPARATUS FOR MANUFACTURING TUBULAR CONTAINER BODIES
Willard A. Meyer, South Salem, N.Y., assignor to American Can Company, New York, N.Y., a corporation of New Jersey
Filed Jan. 17, 1966, Ser. No. 521,197
18 Claims. (Cl. 82—47)

The present invention relates to the manufacture of containers, and, in particular, to an apparatus for accurately subdividing prelabeled multibodied tube sections into a plurality of individual container bodies having their labels accurately and uniformly positioned thereon.

In the art of manufacturing containers, it is well known to form elongated prelabeled tubes from which the individual container bodies are derived. These elongated tubes may be formed in a well-known manner by helically winding onto a suitable mandrel a plurality of ribbons of sheet material made of paper, plastic, foil, or the like, with the successive layers of helically wound ribbons of sheet material having either butt joints or overlapping joints between their convolutions. The layers are superimposed upon each other with suitable adhesives therebetween and with the joints between the successive convolutions of one layer out of alignment with those of the next layer so that in this way it is possible to build up a rigid tubular structure. The tubes are formed in this way in practically endless lengths inasmuch as the ribbons of sheet material which are helically wound are derived from large supply rolls from which the ribbons are continuously fed onto the mandrel in a manner well known in the art.

For convenience in handling it is customary in the art to cut the elongated tubes which are formed on the mandrels into lengths or sections sometimes referred to as "sticks," each of which contain a predetermined number of potential individual container bodies. Subsequently these sticks are subdivided in order to form the individual container bodies, which are thereafter filled and closed in a well-known manner at their ends in order to form final, sealed containers. In order to provide for the various manufacturing variables which are normally encountered, each stick has a length equal to a multiple of the length of the ultimate tubular container body plus a relatively small excess length for trimming purposes. A method of manufacturing tubes in this manner is disclosed in United States Letters Patent Re. 23,899.

It is of course important to subdivide the sticks very precisely into container bodies of suitable length, and in addition it is important that the outside surface of the sticks, which contain printed matter, labels, or other information, be precisely aligned with the tubular lengths. Because of inaccuracies inherent in the mechanism for cutting the elongated tubes into sticks, the cuts at the ends of the stick may be as much as one-half inch out of registration with the labels carried by the sticks, so that if the subdividing cuts are indexed relative to an end of the sticks as has heretofore been done, the labels in many instances are not centered on the cut bodies. This problem is solved by the present invention by providing a mechanism for subdividing the sticks in such manner that the labels on the sticks are accurately indexed relative to the cutting knives which subdivide the sticks into individual bodies. This is accomplished by providing the mechanism with a detector device which is capable of detecting an index mark which is incorporated in the stick label, the detector device then being utilized to actuate a locating mechanism which functions to position the stick in the machine in a position where its labels are accurately indexed relative to the cutting knives which then subdivide the stick into individual, accurately indexed bodies.

In the illustrated form of the invention there are provided a plurality of circular cutting knives for cutting a stick into predetermined tubular lengths. The plurality of cutting knives have a common axis and they are fixedly mounted on a common shaft which situates the cutting knives along a common axis in planes perpendicular to the common axis and parallel to each other. These planes are spaced from each other by distances equal to the predetermined tubular lengths into which the stick is to be subdivided, and the mounting of the knives on a common shaft maintains them in these planes, respectively, during operation of the apparatus. A shifting means shifts a stick along a mandrel having an axis which coincides with the stick axis and which is parallel to the common axis of the plurality of cutting means, and this shifting means acts on the stick to shift it to a location where it is substantially in alignment with and situated beside the plurality of cutting knives. A plurality of preprinted unitary labels are carried by the stick on the exterior thereof and are distributed axially therealong at distances from each other equal to the distances between the abovementioned planes, so that the plurality of labels are also spaced from each other by distances corresponding to the lengths into which the stick is to be subdivided. At least one distinguishing means or index mark, usually in the form of a printed ring which is disposed at right angles to the axis of the stick, is provided as part of the printed matter on each stick in a predetermined area thereof. A detecting means on the machine is utilized to detect this index mark when the stick has all of its labels precisely in alignment with the cutting knives, and an arresting means responsive to a signal from the detecting means is then utilized to stop the shifting movement of the tube at the precise movement that it is accurately indexed relative to the knives, thus accurately positioning the labels with the cutting knives and insuring uniform, accurate placement of the labels on the cut container bodies when the stick is subdivided by the cutting knives in the immediately ensuing cutting operation.

As a result, the present invention provides the means for forming cut can bodies with the labels more accurately indexed thereon than has previously been possible.

It is accordingly a primary object of the invention to provide a cutting machine for cutting labeled tubes into individual bodies having labels accurately indexed thereon.

It is a further object of the invention to provide a machine capable not only of precisely subdividing a stick into proper tubular bodies but also capable of maintaining an extremely high output so that the accuracy with which the tubular bodies are produced by the machine of the invention does not substantially detract from the production of which the machine is capable.

Numerous other objects and advantages of the invention will be apparent as it is better understood from the following description, which, taken in connection with the accompanying drawings, discloses a preferred embodiment thereof.

Referring to the drawings:

FIGS. 2A and 2B are, when taken together, a longitudinal section of the apparatus of FIG. 1 taken along line 2—2 of FIG. 1 in the direction of the arrows with FIG. 2B showing the structure situated to the right of FIG. 2A;

FIG. 3 is an end elevational view of the machine, the view being taken from the left side of FIG. 2A and illustrating the end of the machine opposite that shown in FIG. 1 and furthermore diagrammatically illustrating the detecting means and the structure which responds thereto;

FIG. 4 is a partly sectional longitudinal elevation of a structure for releasably locking an end gauge means; and FIG. 5 is a transverse section of the structure of FIG. 4 taken along line 5—5 of FIG. 4 in the direction of the arrows.

Figure 1:
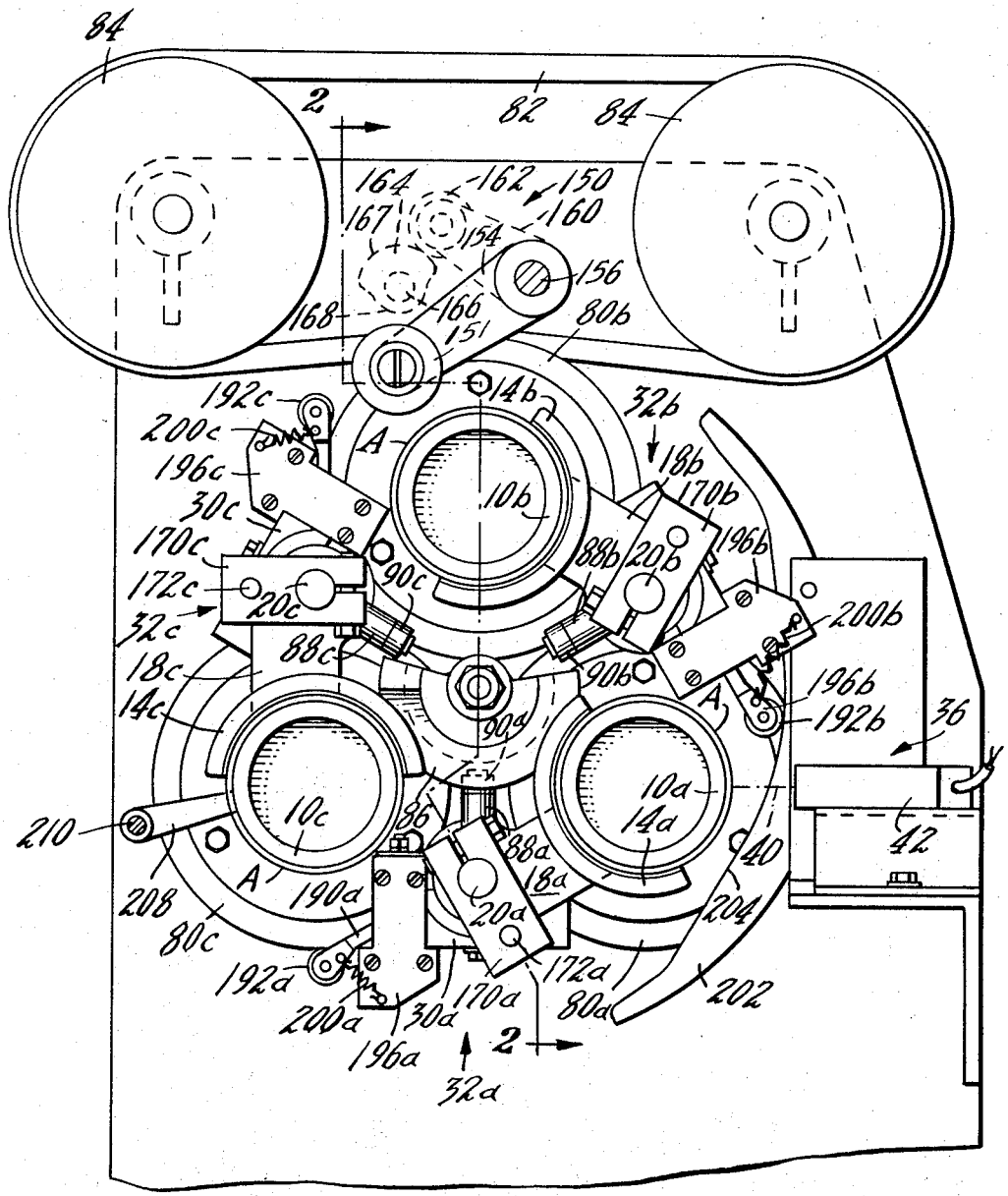
FIGURE 1 is an end view of one possible embodiment of an apparatus according to the present invention.

As has been indicated above, the structure which will eventually form the tubular lengths is initially in the form of layers of windings of suitable sheet material superimposed on and adhering one to the other, these windings being made on a suitable mandrel. For convenience in handling, the tube which is continuously formed in this manner is cut into sticks A, each of which is to be subdivided into a plurality of individual can bodies by the machine described herein, and one of the sticks A derived in this manner is shown in FIG. 2B on a mandrel 10a, the left end of the stick A, as viewed in FIG. 2B, is in engagement with a movable end gauge member 14a. This mandrel 10a, which may be tubular as illustrated in FIG. 1, is shown in FIG. 1 and in FIG. 2B situated at a suitable loading position where it receives the stick A advanced onto the mandrel 10a by the pusher means 12. As is apparent from FIG. 1, the end gauge member 14a extends along approximately a semi-circle around the axis of the mandrel 10a next to the exterior surface thereof.

This end gauge member 14a forms part of an end gauge means 32a which is supported by a suitable support means for axial movement in a direction parallel to the axis of the mandrel 10a. Thus, as may be seen from FIG. 2B, the end gauge member 14a is fixed to a web member 16a which in turn is fixed to a suitable carrier member 18a which carries the web member 16a and through the latter the end gauge member 14a. This carrier 18a is axially shiftable, and for this purpose it is formed with an axial bore through which an elongated guide pin 20a of the support means for the end gauge means 32a extends. This elongated guide pin 20a of the support means is fixed, as by a threaded extension 22a which is integral with the pin 20a, to an outwardly directed arm 24a which extends radially from a sleeve 26 with which the arm 24a is integral. This arm 24a forms one of three arms which are uniformly distributed about and extend radially from the sleeve 26, in the particular example shown in the drawings. Additional pins 20b and 20c of additional pair of support means are respectively carried by the other arms 24b, 24c in the same way that the pin 20a is carried by the arm 24a.

As is apparent from FIG. 1, there are three operating stations uniformly distributed about the axis of the sleeve 26. In FIG. 1, the mandrel 10a is shown as being positioned at a loading station, a second mandrel 10b, associated with the pin 20b, is shown at a cutting station, and a third mandrel 10c, associated with the pin 20c, is shown at a discharge station. The structure and operation of each of the mandrels and the end gauging mechanisms associated therewith which are displaceable from the loading to the cutting and from the cutting to the discharge station, as well as from the discharge station back to the loading station, are identical and for this reason a detailed description is given only for the mandrel 10a and its associated mechanisms.

As may be seen from the lower left portion of FIG. 2B, the supporting and guiding pin 20a, which supports and guides the carrier 18a for axial movement in a direction parallel to the mandrel 10a, is itself parallel to the mandrel 10a. This pin 20a, by way of bolts 28a, serves to carry a supporting plate 30a for a releasable lock means which will releasably lock the end gauge means 32a, comprising the end gauge member 14a, the web 16a, and the carrier 18a, in a predetermined axial position. This releasable lock structure is shown in detail in FIGS. 4 and 5 and is described in greater detail below.

Each stick A carries at least one distinguishing means or index mark 34 on its exterior surface at a generally predetermined position thereon. Although the index mark 34 can take many different forms, such as a projection or depression at the exterior surface of the stick A or a piece of metal embedded in the exterior surface of the stick A, it is preferred, for reasons of simplicity and economy, to provide an index mark 34 which is optically distinguishable from the adjacent exterior surface of the stick in the sense that it will influence a beam of light in a manner different from the influence provided on a beam of light by any other part of the exterior surface of the stick A adjacent to it. Thus, the index mark 34 may be in the form of a very dark printed ring, much darker than the adjacent exterior surface portions of the stick A, or it may be a very light ring, or it may be shiny whereas the adjacent exterior surface of the stick A is quite dull. Any characteristics which will distinguish the index mark 34 from the adjacent portions of the exterior surface of the stick A will suffice for the purposes of the invention.

In the accompanying drawings, the exterior of each stick A is shown as being covered with a plurality of unitary label patterns L, each of which is designed to function as a label for a finished container body. To this end, the purpose of the instant machine is to accurately index the cuts which sever the stick A into the individual container bodies with the label patterns L.

Each stick also carries, at each of its ends, a small area of excess trim material E into which the end cuts are to be made, and which provide the means to compensate for any variations in the manufacturing process by which the stick A is made. Reference is again made to U.S. Letters Patent Re. 23,899 for a detailed description of such process. In the illustrated form of the invention, the index mark 34 takes the form of a printed dark ring which extends at right angles to the axis of the stick A and is disposed centrally between a pair of adjacent labels L so that one of the lines of cut which sever the sticks A into individual bodies will coincide with and split the index mark 34. As a result, a portion of the index mark 34 will be situated at an extreme end of two of the individual bodies from each stick A and these portions will be covered over by the container end closures when they are ultimately seamed onto the bodies. It will be understood that the trim areas E must vary in axial length in each stick A because of the inherent inaccuracy of the process whereby the sticks A are cut from the endless tube on the spiral winder on which they are made, and thus the label patterns L are generally not uniformly located relative to the ends of successive sticks.

As is indicated in FIG. 2B and at the right in FIG. 3, in a diagrammatic manner, the index mark 34 is detected by an optical detecting or scanning means 36. This optical detecting means 36 includes a light source 38 directing a beam or concentrated pencil of light 40 at the surface of the stick A so that the beam will be reflected from the exterior surface of the stick A into a photocell 42. The source 38 and the photocell 42 are electrically connected with an amplifier 44 which is supplied with current from any suitable source such as the generator 46 schematically indicated in FIG. 3. With this arrangement, the intensity of the light beam 40 is significantly changed when it is intercepted or interrupted by the index mark 34. When the index mark 34a is dark, as shown, the concentrated pencil of light 40 is at such time interrupted so that there is a momentary interruption in the output of the photocell 42.

In the particular arrangement illustrated in FIG. 3 a locking relay 48 is electrically connected with the amplifier and responds automatically to the interruption of the light reaching the photocell 32, by virtue of the impingement of the light beam on the card index mark 34, to close the normally open locking relay switch 50 shown at the upper right portion of FIG. 3. This switch 50 is connected in series with a holding switch 52 closed by a cam 54 mounted on a rotary shaft 56 which continuously rotates over for each gauging cycle of the machine. The closing of holding switch 52 takes place at the start of each gauging cycle so that when the locking relay switch 50 is closed by interruption of the light beam 40, the circuit which includes the series connected switches 50 and 52 will be energized with current from any suitable source, such as the source 58 diagrammatically indicated in FIG. 3, and will stay closed until it is broken by the cam 54.

This circuit serves to energize a solenoid valve 60, when the body of the switches 50 and 52 are closed. Solenoid valve 60 controls the flow of a fluid under pressure, such as compressed air, through a conduit 62 to a piston-and-cylinder assembly 64. The conduit 62 can communicate with any source of compressed air, and when the solenoid valve 60 is actuated the air under pressure enters the assembly 64 to raise a piston 65 thereof and, through a linkage 66 which is connected to the piston, turn a lever 68 which a fixed to a rotary member 70. The rotary member 70 is shown at the lower left portion of FIG. 2A supported for rotation in suitable bearings of the frame-work of the machine. This rotary member 70 forms, together with the above-described structure shown in FIG. 3 which responds to the detecting means 36, part of an arresting means which serves a purpose described in greater detail below.

After the stick A has been pushed by the pusher means 12 into engagement with the end gauge member 14a, this end gauge member 14a, which at this time is in its fully retracted position, is shifted by a shifting means of the invention to the right, as viewed in FIG. 2B, so that the stick A is now shifted in a direction opposite to that in which it is pushed onto the mandrel 10a. This shifting means is made up of a yieldable structure shown in FIGS. 2A and 2B and arrested by the above-referred to arresting means when the index mark 34 is precisely located in a predetermined position wherein it intercepts the light beam 40.

The yieldable shifting means includes an elongated rod 72 extending through a rotary shaft 74 (FIG. 2A) which is supported for rotation by suitable bearings of the machine framework. The rod 72 of the yieldable shifting means does not rotate and the shaft 74, which is actually a hollow, axially bored drive shaft, rotates freely around and slidably engages the rod 72. This rotary drive shaft 74 is keyed to the rotary sleeve 26 from which the arm 24a radially projects, as shown in FIG. 2B and described above.

It is to be noted that the sleeve 26 integrally formed with three axially extending bearing assemblies of which a bearing assembly 76b, situated at the cutting station, is visible in FIG. 2B. This bearing assembly serves to support for rotary movement a shaft 78b integrally fixed to a pully 80b capable of being driven from a belt 82 shown at the upper part of FIGS. 1, and 2B.

This belt 82 is continuously driven and is guided about pulleys 84 one of which may be driven in any suitable manner. The pulley 80b has the mandrel 10b fixedly connected thereto and projecting axially therefrom in the manner shown at the upper left portion of FIG. 2B. It is in this manner that the other two mandrels are similarly mounted for rotation on a pair of additional pulleys 80a and 80c indicated in FIG. 1.

As is indicated in FIG. 2A, the rotary hollow shaft 74 is fixed with a pinion 83 which meshes with a gear 84 fixed to a rotary shaft 86. This shaft 86 is intermittently rotated, as by a Maltese-cross or Geneva drive, for example, so as to periodically turn the hollow shaft 74 through angles of 120°. In this way the shaft 74 will locate the parts in the position shown in FIG. 1, whereupon during the next turning of the shaft 74 through 120° the several mandrels will be displaced to the next operating station, and so on, to advance the several mandrels to and through the several operating stations. As each mandrel moves into the cutting station, the pulley on which it is mounted comes into engagement with the constantly driven belt 82, so that whenever a mandrel is at the cutting station it will be rotated, together with the stick A which it carries.

Returning now to the yieldable shifting means which advances the stick A to the right, as viewed in FIG. 2B, this latter means includes, in addition to the elongated rod 72, an arcuate channel member 86, shown in transverse section in FIG. 2B and indicated in end elevation in FIG. 1. As is apparent from FIG. 1, this channel member 86, which is fixed with the rod 72 and therefore does not rotate, extends approximately through 180°. The several mandrels rotate in a counterclockwise direction, as viewed in FIG. 1, from one station to the next in the manner described above, around the channel member 86, so that the channel member 86 has a left entrance end which is open and a right discharge end which is also open, as viewed in FIG. 1.

The several carrier members 18a 18b, 18c of the plurality of end gauge means have integral projections 88a, 88b, and 88c, respectively, (see FIG. 1) which terminate in slide rollers or blocks 90a, 90b and 90c which are successively received in the open-ended arcuate channel member 86 of the yieldable shifting means. Therefore, when each end gauge means moves from the discharge station to the loading station its slide block enters and remains in the channel member 86. It will be noted that in FIG. 1, as well as in FIG. 2B, the slide block 90a is shown in the channel member 86 while the slide block 90c is situated at the entrance end of the channel member and will move into the latter during the next 120° increment of movement of the rotary shaft 74. During this next 120° increment the slide block 90a will move outwardly beyond the channel member 86 to assume the position shown in FIG. 1 for the slide block 90b. In this way a releasable connection is provided between the yieldable shifting means, and that end gauge means which happens to be at the loading station. To facilitate entrance of each slide block into the channel member 86, its entrance end is widened or flared outwardly, as indicated in FIG. 1.

The end of the rod 72 which is distant from the channel member 86 fixedly carries a cylindrical brake drum 92 shown in FIGS. 2A and 3. This brake drum 92 forms part of the arresting means referred to above. To the right of the brake drum 92 the rod 72 fixedly carries a cross pin 94 shiftable in vertically spaced slots 96 formed in a stationary frame member 98, so that the rod 72 is prevented from rotating, the member 98 being formed with bores which slidably receives the rod 72. In this way not only is the rod 72 prevented from rotating, but in addition the extent of axial movement thereof is limited by the length of the slots 96 which receive the free ends of the pin 94.

Just to the right of the slotted frame member 98 the shaft 72 fixedly carries a collar 100 which may be adjustably fixed thereon by a suitable set screw, and to the right of the collar 100 the rod 72 carries a second collar 102 which also may be adjustably fixed on the rod 72 by way of a suitable set screw. It will be noted that the frame member 104 is formed with an opening 106 to provide clearance for the collar 102.

Between the collars 100 and 102 the shaft or rod 72 carries a slidable sleeve 108. This sleeve 108 in turn carries a set screw 110 having an inner flat end engaging a flat 112 formed on the exterior surface of the rod 72 so that while the sleeve 108 can shift axially along the rod 72 it cannot rotate. Since the rod 72 itself cannot rotate it is clear that the sleeve 108 will move only axially. The shifting means is rendered yieldable by way of a coil spring 114 coiled about the rod 72 and compressed between the sleeve 108 and the collar 102, so that the coil spring 114 urges the sleeve 108 to the left into engagement with the collar 100, as viewed in FIG. 2A.

This sleeve 108 carries a radial projection which is integral with the sleeve and which terminates in a cam roller 116 received in a cam groove 118 formed in a rotary cam 120 which is fixedly mounted on a shaft 122 supported for rotation by suitable bearings of the frame of the machine, and of course the shaft 122 extends parallel to the rod 72.

The right end of the rotary shaft 122, as viewed in FIG. 2A, fixedly carries a sprocket engaged by an endless chain 124 driven by an upper sprocket 126 fixed to a rotary shaft 128 supported for rotation in any suitable bearing and continuously driven at a speed which will rotate the cam 120 through one revolution during each operating cycle. This shaft 122 also carries a gear 130 which meshes with a pinion 132 which rotates the shaft 56 referred to above and shown at the upper portion of FIG. 3 as carrying the rotary cam 54, so that it is through this transmission that the switch 52 is periodically closed during each cycle in accordance with the rotary movement of the cam 54.

According to a further feature of the invention, the detecting means 36 is rendered operative only when the index mark 34 is in the immediate region of the detecting means 36. To effect this, the position of the cam 54 and the speed with which the shaft 56 is rotated are such that the switch 52 will be closed only when the index mark 34 is in the region of the detecting means, so that when the solenoid valve 60 is actuated by virtue of the interruption of the light beam 40 by the index mark 34, the stick will be precisely located along the mandrel 10a, in a manner described in greater detail below.

The structure of the invention which causes the detecting means 36 to become operative only when the stick A is being moved backwardly along the mandrel 10a by the end gauge member 14a—i.e., during the gauging cycle of the machine—includes a cam 134 which is fixed to the rotary shaft 122 and which controls a switch 136 which controls the light source 38, as shown diagrammatically in FIG. 3. The cam 134 rotates once during each operating cycle, and is so shaped that the light source 38 is on only during the gauging cycle.

During this gauging cycle, the rotary cam 120 operates to displace the sleeve 108 to the right, as viewed in FIG. 2A, and through the spring 114 and the collar 102 the rod 72 will also be shifted to the right causing the channel member 86 by its temporary connection with the end gauge means 32a to shift this latter end gauge means to the right, as viewed in FIG. 2B. Therefore, the end gauge member 14a by engaging the left end of the stick A, will advance the latter to the right also. This operation continues until the index mark 34 reaches the point where the incident and reflected beams intersect along the light path 40. At this instant the light beam moving along the path 40 will of course be interrupted by the index mark 34 so that the photocell 42 will experience a sharp change in the character of the light received thereby, thus operating the relay 48 and causing the switch 50 to close. This in turn completes the circuit which includes the previously closed switch 52 and the solenoid 60, and causes compressed air to enter the assembly 64 and lift the piston 65, thus rocking the levers 66, 68.

In this way the lever 68 will be automatically turned in a clockwise direction, as viewed in FIG. 3, with the result that the rotary member 70 turns in a clockwise direction.

This rotary member 70 fixedly carries a cross pin 138 situated between the end faces of a pair of brake shoes 140 supported for rotary movement about a stationary shaft 142 (FIG. 3). The shoes 140 fixedly carry at their inner faces layers of friction material 144. The brake drum 92 is clamped directly to the rod 72 by a clamp 146 indicated in FIG. 3. The lower ends of the brake shoes 140 are formed with aligned openings through which a bolt 148 freely passes, and this bolt carries a spring 155 which biases the lower ends of the shoes 140, as viewed in FIG. 3, toward each other. However, in the rest position of the linkage 55, determined by the adjustable stop 153 as shown in FIG. 3, the cross pin 138 maintains the friction layers 144 away from the exterior surface of the drum 92 so that the rod 72 can be freely advanced. As soon as the solenoid valve 60 is actuated upon interruption of the light beam moving along the path 40, the linkage 66 moves upwardly to turn the lever 68 and the rod 70 in a clockwise direction, as viewed in FIG. 3, thus turning the cross pin 138 to a vertical position which permits the spring 155 to press the lower ends of the brake shoes 140 toward each other so that the friction linings 144 are pressed against the drum 92 and the axial movement of the rod 72 to the right, as viewed in FIG. 2A, is terminated. However, during the continuing rotation of the cam 120 the sleeve 108 continues to advance to the right by sliding movement along the rod 72, which is now stationary, in opposition to the spring 114 which becomes further compressed between the sleeve 108 and the collar 102.

As a result of this stoppage of movement of the rod 72, the movement of the channel member 86, and consequently of the end gauge means 32a also ceases, and the stick A is very precisely situated along the mandrel 10a with its index mark 34 at the point of intersection of the light beam 40 and the surface of the stick A.

Very shortly after this, the high spot of the cam 134 moves beyond the switch 136 which automatically opens to terminate the operation of the detecting means 36. This detecting mechanism does not again come into operation until the next cycle of the machine when the mandrel 10c occupies the position occupied by the mandrel 10a in the position of the parts shown in the drawings.

Shortly after the stick A is thus gauged on the mandrel, the intermittent drive of the machine effects a 120° rotation of the shaft 74 to advance all of the mandrels to the succeeding stations, thus moving the gauged stick A to the cutting station where it is subdivided into individual can bodies in a manner to now be described.

Referring now to FIGS. 2A and 2B, as well as FIG. 1, the cutting station of the instant machine includes cutting means 150 in the form of a plurality of sharp rotary cutting blades or knives 151 capable of cutting through the material of the stick A when pressed thereagainst. The rotary knives 151 are supported along a common axis on relatively short arbors 152 fixedly carried by levers 154 fixed to an elongated rod 156 which is supported for rotation at its ends by bearings such as the bearings 158. The axial position of the rod 156 is very precisely determined and of course the distances of the several cutter-supporting levers 154 therealong is also precisely determined so that the rotary cutting knives 151 are very precisely situated in planes which are perpendicular to the parallel axes of the mandrels and are spaced from each other by distances which precisely equal the lengths into which the stick A is to be subdivided by the cutting knives 151. Thus, the distances between the planes in which the several cutting knives 151 are located equal the distances between corresponding points on the label patterns L, and of course the third cutting knife 151 from the left in FIG. 2B is very precisely positioned in the same plane as that in which the index mark 34 is disposed when it intercepts the light beam 40 and stops the return movement of the stick A. As a result of this, the cutting knives 151 are exactly indexed to the label patterns L on each stick A at the conclusion of each cycle of the detector means 36.

It will of course be realized that the index mark 34 need not be positioned in the plane at any one of the knives 151, but may instead be positioned anywhere on the outer surface of the stick A, including in an interior position in a label pattern L. In such event, the detector device 36 would have to be shifted along the mandrel 10a to compensate for the changed position of the index mark.

It is also obvious that more than one index mark 34 may be provided on the exterior of the stick A, as would be the case where the index mark is made an integral portion of each label design or where it is placed between each of the label patterns L in order to make possible alternate locations of the detecting mechanism. However, in such case, only one such index mark would be used to effect the gauging operation.

One end of the shaft 156 fixedly carries a lever 160 (see FIG. 1) which supports, at its free end, a cam follower roller 162 mounted for free rotary movement. This cam follower roller 162 engages a rotary cam 164 shown in FIGS. 1 and 2A. This cam 164 is fixed on a shaft 166 which is rotated by any suitable drive at such a speed that the cam 164 will turn through one revolution in each operating cycle. The weight of the cutting means 150 continuously urges the shaft 156 in a counterclockwise direction, as viewed in FIG. 1, so as to maintain the follower 162 in engagement with the cam 164. If desired, suitable spring means (not shown) may be utilized to augment this gravitational force.

The cam 164 has a high spot 167 of a greater radius than its low spot 168, and when its low spot 168 is engaged by the follower 162 the shaft 156 is turned by the weight of the structure which it carries (and by the spring means, if provided) in a counterclockwise direction, as viewed in FIG. 1, through an angle sufficient to press the cutters into and through the wall of the previously indexed stick which is shown in FIG. 2B at the cutting station with its label patterns L precisely indexed to the several cutting knives 151, as described above. Of course, when the mandrel 10b had reached the cutting station, its pulley 80b had come into engagement with the drive belt 82 so that the mandrel 10b with the stick thereon continuously rotates while at the cutting station, with the result that the freely rotatable cutting knives 151 made complete circular cuts through the stick A along lines which are located precisely at the opposite ends of each label pattern L, with the outer knives 151 cutting into the trim areas E at the ends of the stick. In this way the knives 151 subdivide the stick A into individual can bodies B whereon the label patterns L are precisely and uniformly centered.

In order to prevent axial movement of the end gauge member 14a and thus of the gauged stick A during movement of the stick A to the cutting station and while the stick A is at the cutting station, a releasable lock means is utilized, as pointed out above. As is apparent from FIG. 2B, the right end of the supporting and guiding pin 20a fixedly carries a support member 170a which is clamped onto the free end of the pin 20a, and this member 170a supports a guide pin 172a which extends through an opening formed in a portion of the carrier 18a so that the latter is also guided by way of the guide pin 172a. It will be noted that the angular position of the clamp member 170a can be fixed with respect to the pin 20a, so that through the guide pin 172a the angular orientation of the carrier 18a on the pin 20a is determined without, however, disturbing the desired extent of free axial movement of the carrier 18a along the pin 20a.

Distant from the slide block 90a and the portion guided by the pin 172a, this carrier 18a has an exterior cylindrical brake surface 174a (FIG. 4), which is acted upon by layers of friction material 176a similar to the layers 144 which act on the brake drum 92. Thus, the cylindrical portion 174a of the carrier 18a forms a structure corresponding to the drum 92 and acted upon in the same way by the layers of friction material 176a. These layers of frictional material 176a (FIG. 5) are carried by the inner surfaces of a pair of brake arms 178a which are mounted for rotary movement on a common pin 180a fixedly carried by an upwardly directed projecting portion 182a of the supporting plate 30a. Thus, one of the arms 178a extends beneath and the other of the arms 178a extends over the portion 174a of the sleeve 18a, as is particularly apparent from FIG. 5.

The free ends of the levers 178a, which are distant from their pivotal support pin 180a, are formed with aligned openings through which a bolt 182a, carrying suitable lock nuts, freely passes. At its lower end the bolt 182a is formed with an integral bearing block 183a through which passes a short pin 184a which also passes through a bore formed in a cam 186a which is split laterally to receive the block 183a. A spring 188a extends around the bolt 182a and engages the free ends of the levers 178a to tend to urge them apart from each other and to maintain the free end of the lower lever 178a in engagement with the upper camming surface of the split cam 186a. This split cam 186a is fixedly carried by the free end of a lever 190a which is turnable on the pin 184a and which at its outer end carries a freely rotatable cam follower roller 192a. The pin 184a which pivotally supports the lever 190a is located between an upwardly directed wall portion 194a of the plate 30a as well as a front plate member 196a fixed to the wall portion 194a as by bolts 198a. Suitable spacers may be situated between the plate 196a and the wall 194a. Thus, the upper end of the lever 190a as well as the free ends of the levers 178a are situated between and freely slidable in the space between the plate 196a and the wall portion 194a. A spring 200a is connected at one end to the lever 190a and at its opposite end to a pin fixed to and projecting from the plate 196a so that the spring 200a, shown also in FIG. 1, tends to turn the lever 190a to the position shown in FIG. 5 where the contour of the cam 186a functions to maintain the levers 178a at positions where the friction linings 176a do not press against the brake surface 174a of the carrier 18a.

However, during rotation of the mandrel 10a from the loading to the cutting station the cam follower roller 192a comes into engagement with a cam 202 (see FIG. 1) which is fixedly mounted along the path of travel of the cam follower rollers 192a, 192b, and 192c of the several units. The contour of the inner camming surface 204 of the cam 202 is such that the lever 190a is rocked against the pressure of the spring 200a in a clockwise direction to the position occupied by the lever 190b in FIG. 1.

When the lever 190a is thus rocked, the upper camming surface of the cam 186a moves the free end of the lower lever 178a upwardly, thus pressing the lower friction lining 176a against the brake surface 174a of the carrier 18a. Because of the limited movement provided for the lower lever 178a the continued turning of the lever 190a causes the pin 184a together with the bolt 182a to be displaced downwardly in opposition to the spring 188a, thus pressing the upper friction lining 176a against the brake drum 174a, and in this way the carrier 18a is releasably locked in the axial position to which it has been moved by way of its releasable connection with the rod 72, as pointed out above.

Thus, while each mandrel is shifted from the loading station and while it remains at the cutting station, its end gauge means remains locked against axial movement because of the fact that its follower roller 192 is in engagement with the camming surface 204 of the stationary cam 202. It will be realized that during this rotary movement of a mandrel from the loading to the cutting station, its slide block 90 moves out of the groove of the channel member 86, thereby transferring control of its end gauge member from the channel member 86 to the cam 202.

Shortly after the channel member 86 thus releases the end gauge member, the cam 54 opens the switch 52, thus breaking its circuit and opening the locking switch 50, and simultaneously deenergizing the relay 60, thus cutting the flow of compressed air into the piston cylinder assembly 64 and simultaneously venting the latter. As a result, the cross pin 138 is rocked to its inclined position wherein it releases the brake shoes 140, thus releasing the shaft 72. Later, when the assembly moves beyond the cutting station to the discharge station its cam follower roller 192 rides off the cam 202 thereby freeing the end gauge means for a resetting movement back to its normal, retracted position.

At the discharge station, the subdivided stick A is stripped from the mandrel by a stripper finger 208 which engages the front end of the stick A. The finger 208 is carried by a shaft 210 which reciprocates it through an operating stroke in a direction parallel to the axes of the mandrels.

To effect the resetting movement of the end gauge member, the entrance end of the groove of the channel member 86 is widened or flared sufficiently to insure entrance of the block 90 of the assembly when the assembly is moved from the cutting to the loading station regardless of the relative axial positions of the block 90 and channel member 86 at this time. Thus, when the assembly arrives at the loading station, the cam 120 pulls the previously released shaft 72 to the left to its full retracted position, and consequently also moves the end gauge means to its retracted position, via the engagement between the block 90 and channel member 86, thus resetting the mechanism for the next cycle.

It is to be noted that the operation of the machine described above is relatively simple. The sticks A are pushed by the pusher means 12 in one direction onto the mandrels at the loading station until they engage the end gauge members which at the moment of engagement are in their fully retracted position. The end gauge members then are actuated to move the sticks A in the opposite direction along the mandrels until the index marks on the sticks intercept the reflected light beam, thereby actuating the arresting means 92, 140 to stop the movement of the end gauge members and thus position the sticks A on the mandrels in properly indexed position relative to the cutting knives 151. Thereafter, the end gauge members are locked in indexed position and the mandrels are moved to the cutting station adjacent the cutting knives, and the cuts which subdivide the sticks into individual container bodies are made. The mandrels are then moved to the discharge station where the cut sticks are stripped from the mandrels and discharged from the machine. Just prior to the movement of the mandrels to the discharge station, the end gauge members are unlocked and then, when the mandrels are moved to the loading station, the end gauge mandrels are reset to their retracted positions preparatory to the reception of the succeeding sticks.

It will be realized that the full gauging stroke of each gauging mechanism is determined by the throw of the cam 120, and that this throw must therefore encompass the full range of variations encountered in the placement of the label patterns L relative to the front end of the tube, which variation normally does not exceed one-half an inch. It will also be realized that the forward or gauging stroke of the gauging mechanism may or may not vary from stick to stick, and is dependent on the variations in the placement of the labels thereon.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a registration therebetween.

I claim:

1. An apparatus for subdividing a stick having a preapplied index mark on its outer surface into a plurality of can bodies of predetermined lengths, comprising a plurality of cutting members mounted predetermined distances apart, means for shifting said stick axially of said cutting members, detecting means for detecting said index mark when said stick is axially registered relative to said cutting members, means for arresting the axial shifting of said stick when said index mark is detected by said detecting means, and means for bringing said cutting means into contact with said stick while maintaining the axial registration therebetween.

2. The apparatus of claim 1 wherein said cutting means comprise rotary knives mounted on a common axis.

3. The apparatus of claim 1 wherein said detecting means comprises a photoelectric unit which projects a light beam against the outer surface of said stick.

4. The apparatus of claim 1 wherein said detecting means is rendered operative only for that period of the cycle of the machine when the index mark is in close proximity to the point at which said light beam strikes the outer surface of said tube.

5. The apparatus of claim 1 wherein said arresting means is responsive to said detecting device.

6. The apparatus of claim 1 wherein said stick is fed over a mandrel while it is being shifted relative to said cutting members.

7. The apparatus of claim 6 wherein means are provided to move said cutting members into contact with said stick after said stick has been axially registered with said knives.

8. The apparatus of claim 6 wherein said stick is moved axially along said mandrel into engagement against a gauging member, and is then shifted in the reverse direction axially along said mandrel, and wherein said detecting means are rendered operative only during said reverse movement of said stick.

9. The apparatus of claim 6 wherein said mandrel is mounted on a turret which is intermittently movable from station-to-station of said apparatus wherein said detecting means is mounted at one station of said apparatus and wherein said cutting members are mounted at another station of said apparatus.

10. An apparatus for subdividing a prelabeled stick having a preapplied index mark on its outer surface into a plurality of individual labelled can bodies, comprising in combination a mandrel, a gauging member mounted adjacent said mandrel, means for moving a stick along said mandrel into contact with said gauging member, a plurality of cutting knives mounted on a common axis extending parallel to the axis of said mandrel, detecting means mounted adjacent said mandrel for detecting said index mark when the labels on said stick are axially registered with said cutting knives, means for moving said gauging member to bring said index mark into the operative range of said detecting means, means for arresting the movement of said gauging member when said index mark is detected by said detecting means, and means for moving said mandrel towards said cutting knives while maintaining the axial registration between said stick and said cutting knives.

11. The apparatus of claim 10 wherein said gauging member is moved in a direction reversely to that in which said stick is initially fed along said mandrel in order to bring said index mark into the operative range of said detecting means.

12. The apparatus of claim 11 wherein said detecting means is rendered inoperative while said stick is initially fed along said mandrel and until it engages said gauging member.

13. The apparatus of claim 10 wherein means are provided to lock said gauging means against axial shifting while said mandrel is moved towards said cutting knives.

14. The apparatus of claim 10 wherein said detecting means comprises a photoelectric device for projecting a beam of light against the outer surface of said stick.

15. The apparatus of claim 14 wherein said arresting means is responsive to said detecting means.

16. The apparatus of claim 15 wherein said arresting means is responsive to said detecting means only while said gauging member is shifting said stick along said mandrel.

17. The method of indexing a multilabeled stick to a plurality of cutting knives mounted on a common axis in order to register the labels on the stick with the cutting knives, comprising providing an index mark on the labeled surface of said stick, moving said stick along a path of travel parallel to the axis of said cutting knives, projecting a beam of light against the surface of said stick at a point correlatable to the point at which said labels are indexed to said cutting knives, and utilizing the signal generated when said index mark intercepts said beam of light to arrest the movement of said stick when in properly indexed position.

18. The method of indexing a multilabeled stick to a plurality of cutting knives mounted on a common axis in order to register the labels on the stick with the cutting knives, comprising providing an index mark on the outside surface of said stick, moving said stick along a path of travel parallel to the axis of said cutting knives, and causing said index mark to generate a signal which is utilized to arrest the movement of said stick when the labels thereon are in axial registration with said cutting knives.

No references cited.

HARRISON L. HINSON, *Primary Examiner.*